(12) United States Patent
Koetting et al.

(10) Patent No.: US 9,337,456 B2
(45) Date of Patent: May 10, 2016

(54) FRAME MEMBER, FRAME ASSEMBLY AND BATTERY CELL ASSEMBLY MADE THEREFROM AND METHODS OF MAKING THE SAME

(75) Inventors: William Koetting, Davisburg, MI (US); Kwok Tom, Madison Heights, MI (US); Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 1020 days.

(21) Appl. No.: 12/426,795

(22) Filed: Apr. 20, 2009

(65) Prior Publication Data
US 2010/0266883 A1    Oct. 21, 2010

(51) Int. Cl.
*H01M 2/14*    (2006.01)
*H01M 2/18*    (2006.01)
*H01M 2/10*    (2006.01)
*H01M 10/625*    (2014.01)
(Continued)

(52) U.S. Cl.
CPC .......... *H01M 2/1077* (2013.01); *H01M 10/613* (2015.04); *H01M 10/625* (2015.04); *H01M 10/647* (2015.04); *H01M 10/6551* (2015.04); *H01M 10/6555* (2015.04); *H01M 10/6557* (2015.04); *H01M 10/6561* (2015.04); *H01M 10/052* (2013.01); *Y02T 10/7011* (2013.01); *Y10T 29/49108* (2015.01)

(58) Field of Classification Search
CPC ....................................................... H01M 2/10
USPC ................... 429/96, 138; 29/623.1
See application file for complete search history.

(56) References Cited

U.S. PATENT DOCUMENTS

| 2,273,244 A | 2/1942 | Ambruster |
| 3,503,558 A | 3/1970 | Galiulo et al. |

(Continued)

FOREIGN PATENT DOCUMENTS

| CN | 1512518 A | 7/2004 |
| EP | 0736226 B1 | 3/1999 |

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — Daniel Gatewood
(74) *Attorney, Agent, or Firm* — Buckert Patent & Trademark Law Firm, PC; John F. Buckert

(57) ABSTRACT

A frame member for housing a battery cell, frame assembly and frame/battery cell assembly made therefrom, as well as respective methods of making the same, are disclosed. A frame member for housing a battery cell includes an integral frame having a peripheral wall, the peripheral wall having an attachment face and an opposed cooling face, and an attachment feature located on the attachment face and a complementary attachment feature located on the attachment face that is symmetrically opposed to the attachment feature about a plane of symmetry of the frame, the peripheral wall defining an opening that is configured to matingly receive a battery cell therein. A pair of frame members having a cooling member placed therebetween and attached to the respective attachment faces comprises a frame assembly. A frame/battery cell assembly includes a pair of frame assemblies having at least one battery cell placed therebetween.

12 Claims, 11 Drawing Sheets

(51) Int. Cl.
*H01M 10/647* (2014.01)
*H01M 10/6551* (2014.01)
*H01M 10/6557* (2014.01)
*H01M 10/6555* (2014.01)
*H01M 10/6561* (2014.01)
*H01M 10/613* (2014.01)
*H01M 10/052* (2010.01)

(56) References Cited

U.S. PATENT DOCUMENTS

| | | | |
|---|---|---|---|
| 3,522,100 A | 7/1970 | Lindstrom | |
| 3,866,704 A | 2/1975 | Bowers et al. | |
| 4,390,841 A | 6/1983 | Martin et al. | |
| 4,396,689 A | 8/1983 | Grimes et al. | |
| 4,936,409 A | 6/1990 | Nix et al. | |
| 4,950,561 A * | 8/1990 | Niksa et al. | 429/404 |
| 5,071,652 A | 12/1991 | Jones et al. | |
| 5,270,131 A | 12/1993 | Diethelm et al. | |
| 5,346,786 A | 9/1994 | Hodgetts | |
| 5,354,630 A | 10/1994 | Earl et al. | |
| 5,364,711 A | 11/1994 | Yamada et al. | |
| 5,378,555 A | 1/1995 | Waters et al. | |
| 5,385,793 A | 1/1995 | Tiedemann et al. | |
| 5,480,743 A | 1/1996 | Mccarter et al. | |
| 5,487,955 A | 1/1996 | Korall et al. | |
| 5,487,958 A | 1/1996 | Tura | |
| 5,510,203 A | 4/1996 | Hamada et al. | |
| 5,520,976 A | 5/1996 | Giannetti et al. | |
| 5,558,949 A | 9/1996 | Iwatsuki et al. | |
| 5,561,005 A | 10/1996 | Omaru et al. | |
| 5,589,290 A | 12/1996 | Klink et al. | |
| 5,606,242 A | 2/1997 | Hull et al. | |
| 5,652,502 A | 7/1997 | Van Phuoc et al. | |
| 5,658,682 A | 8/1997 | Usuda et al. | |
| 5,663,007 A | 9/1997 | Ikoma et al. | |
| 5,693,432 A | 12/1997 | Matsumoto | |
| 5,756,227 A | 5/1998 | Suzuki et al. | |
| 5,796,239 A | 8/1998 | Van Phuoc et al. | |
| 5,825,155 A | 10/1998 | Ito et al. | |
| 5,982,403 A | 11/1999 | Inagaki | |
| 6,016,047 A | 1/2000 | Notten et al. | |
| 6,099,986 A | 8/2000 | Gauthier et al. | |
| 6,117,584 A | 9/2000 | Hoffman et al. | |
| 6,121,752 A | 9/2000 | Kitahara et al. | |
| 6,230,834 B1 | 5/2001 | Van Hout et al. | |
| 6,257,328 B1 | 7/2001 | Fujiwara et al. | |
| 6,353,815 B1 | 3/2002 | Vilim et al. | |
| 6,362,598 B2 | 3/2002 | Laig-Horstebrock et al. | |
| 6,406,812 B1 | 6/2002 | Dreulle et al. | |
| 6,413,678 B1 | 7/2002 | Hamamoto et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B2 | 10/2002 | Parish, IV et al. | |
| 6,475,659 B1 | 11/2002 | Heimer | |
| 6,515,454 B2 | 2/2003 | Schoch | |
| 6,534,954 B1 | 3/2003 | Plett | |
| 6,563,318 B2 | 5/2003 | Kawakami et al. | |
| 6,648,090 B2 | 11/2003 | Iwase | |
| 6,709,783 B2 | 3/2004 | Ogata et al. | |
| 6,724,172 B2 | 4/2004 | Koo | |
| 6,771,502 B2 | 8/2004 | Getz, Jr. et al. | |
| 6,780,538 B2 | 8/2004 | Hamada et al. | |
| 6,821,671 B2 * | 11/2004 | Hinton et al. | 429/120 |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,886,249 B2 | 5/2005 | Smalc | |
| 6,892,148 B2 | 5/2005 | Barsoukov et al. | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,074,517 B2 | 7/2006 | Higashino | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,147,045 B2 | 12/2006 | Quisenberry et al. | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,315,789 B2 | 1/2008 | Plett | |
| 7,321,220 B2 | 1/2008 | Plett | |
| 7,327,147 B2 | 2/2008 | Koch | |
| 7,400,115 B2 | 7/2008 | Plett | |
| 7,446,504 B2 | 11/2008 | Plett | |
| 7,479,758 B2 | 1/2009 | Moon | |
| 7,518,339 B2 | 4/2009 | Schoch | |
| 7,521,895 B2 | 4/2009 | Plett | |
| 7,525,285 B2 | 4/2009 | Plett | |
| 7,540,102 B2 | 6/2009 | Olmr et al. | |
| 7,583,059 B2 | 9/2009 | Cho | |
| 7,589,532 B2 | 9/2009 | Plett | |
| 7,656,122 B2 | 2/2010 | Plett | |
| 7,723,957 B2 | 5/2010 | Plett | |
| 7,776,466 B2 | 8/2010 | Oh | |
| 7,794,868 B2 | 9/2010 | Yang | |
| 7,829,216 B2 | 11/2010 | Han et al. | |
| 7,883,793 B2 | 2/2011 | Niedzwiecki et al. | |
| 7,976,980 B2 | 7/2011 | Yoon et al. | |
| 7,981,538 B2 | 7/2011 | Kim et al. | |
| 8,067,111 B2 | 11/2011 | Koetting et al. | |
| 8,163,412 B2 | 4/2012 | Koetting et al. | |
| 8,202,645 B2 | 6/2012 | Young | |
| 8,309,248 B2 | 11/2012 | Koetting et al. | |
| 2001/0035739 A1 | 11/2001 | Laig-Horstebrock et al. | |
| 2001/0046624 A1 | 11/2001 | Goto et al. | |
| 2002/0130637 A1 | 9/2002 | Schoch | |
| 2002/0169581 A1 | 11/2002 | Sarfert | |
| 2003/0052690 A1 | 3/2003 | Schoch | |
| 2003/0082440 A1 | 5/2003 | Mrotek et al. | |
| 2003/0184307 A1 | 10/2003 | Kozlowski et al. | |
| 2004/0000892 A1 | 1/2004 | Jae-Seung | |
| 2004/0021442 A1 | 2/2004 | Higashino | |
| 2004/0032264 A1 | 2/2004 | Schoch | |
| 2004/0189257 A1 | 9/2004 | Dougherty et al. | |
| 2005/0001627 A1 | 1/2005 | Anbuky et al. | |
| 2005/0026014 A1 | 2/2005 | Fogaing et al. | |
| 2005/0035742 A1 | 2/2005 | Koo et al. | |
| 2005/0046388 A1 | 3/2005 | Tate, Jr. et al. | |
| 2005/0100786 A1 | 5/2005 | Ryu et al. | |
| 2005/0123828 A1 | 6/2005 | Oogami et al. | |
| 2005/0127874 A1 | 6/2005 | Lim et al. | |
| 2005/0134038 A1 | 6/2005 | Walsh | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2006/0234119 A1 | 10/2006 | Kruger et al. | |
| 2006/0286450 A1 | 12/2006 | Yoon et al. | |
| 2007/0035307 A1 | 2/2007 | Schoch | |
| 2007/0046292 A1 | 3/2007 | Plett | |
| 2007/0072066 A1 | 3/2007 | Yoon et al. | |
| 2007/0103120 A1 | 5/2007 | Plett | |
| 2007/0120533 A1 | 5/2007 | Plett | |
| 2007/0141457 A1 | 6/2007 | Amagai | |
| 2007/0188143 A1 | 8/2007 | Plett | |
| 2007/0207377 A1 * | 9/2007 | Han et al. | 429/162 |
| 2007/0236182 A1 | 10/2007 | Plett | |
| 2008/0094035 A1 | 4/2008 | Plett | |
| 2009/0029239 A1 | 1/2009 | Koetting et al. | |
| 2009/0186265 A1 | 7/2009 | Koetting et al. | |
| 2009/0325051 A1 | 12/2009 | Niedzwiecki et al. | |

(56) References Cited

U.S. PATENT DOCUMENTS

| | | |
|---|---|---|
| 2009/0325052 A1 | 12/2009 | Koetting et al. |
| 2009/0325053 A1 | 12/2009 | Koetting et al. |
| 2009/0325054 A1 | 12/2009 | Payne et al. |
| 2009/0325055 A1 | 12/2009 | Koetting et al. |
| 2009/0325059 A1 | 12/2009 | Niedzwiecki et al. |
| 2010/0086842 A1 | 4/2010 | Yang |
| 2010/0275619 A1 | 11/2010 | Koetting et al. |
| 2010/0276132 A1 | 11/2010 | Payne |
| 2010/0279152 A1 | 11/2010 | Payne |
| 2010/0279153 A1 | 11/2010 | Payne |
| 2010/0279154 A1 | 11/2010 | Koetting et al. |
| 2011/0027625 A1 | 2/2011 | Payne |
| 2011/0027640 A1 | 2/2011 | Gadawski et al. |
| 2011/0052959 A1 | 3/2011 | Koetting et al. |
| 2011/0256446 A1 | 10/2011 | Bronczyk et al. |

FOREIGN PATENT DOCUMENTS

| | | | |
|---|---|---|---|
| EP | 0673553 | B1 | 2/2001 |
| EP | 1091432 | A2 | 4/2001 |
| EP | 1435675 | A1 | 7/2004 |
| JP | 58084882 | A | 5/1983 |
| JP | 4056079 | A | 2/1992 |
| JP | 8138735 | A | 5/1996 |
| JP | 8222280 | A | 8/1996 |
| JP | 9129213 | A | 5/1997 |
| JP | 09219213 | | 8/1997 |
| JP | 10199510 | A | 7/1998 |
| JP | 11066949 | A | 3/1999 |
| JP | 11191432 | A | 7/1999 |
| JP | 2002038033 | A | 2/2002 |
| JP | 2003188323 | A | 7/2003 |
| JP | 2003219572 | A | 7/2003 |
| JP | 2003257505 | A | 9/2003 |
| JP | 2003346745 | A | 12/2003 |
| JP | 2003346749 | A | 12/2003 |
| JP | 2004055456 | A | 2/2004 |
| JP | 2005122927 | A | 5/2005 |
| JP | 2005126315 | | 5/2005 |
| JP | 2005349955 | A | 12/2005 |
| JP | 2006155962 | A * | 6/2006 |
| JP | 2008080995 | | 4/2008 |
| JP | 2008103248 | A | 5/2008 |
| JP | 2009009889 | A | 1/2009 |
| KR | 100256750 | B1 | 5/2000 |
| KR | 100503853 | B1 | 7/2005 |
| KR | 1020050092605 | A | 9/2005 |
| KR | 20070012809 | A | 1/2007 |
| KR | 100765659 | B1 | 10/2007 |
| KR | 100813812 | B1 | 3/2008 |
| KR | 100889241 | B1 | 4/2008 |
| KR | 20080047641 | A | 5/2008 |
| KR | 100904375 | B1 | 6/2009 |
| KR | 100905393 | B1 | 6/2009 |
| KR | 100921346 | B1 | 10/2009 |
| WO | WO94/02969 | A1 | 2/1994 |
| WO | WO03/071616 | A2 | 8/2003 |
| WO | WO2004/023595 | A1 | 3/2004 |
| WO | 2006059455 | A | 6/2006 |
| WO | 2006093010 | A | 9/2006 |
| WO | 2006101342 | A | 9/2006 |
| WO | 2009103527 | A | 8/2009 |

OTHER PUBLICATIONS

European Supplementary Search Report dated Aug. 28, 2009 for EP Application No. 04774658.
International Search Report for International application No. PCT/KR2005/003755 dated Mar. 2, 2006.
International Search Report for International application No. PCT/KR2009/000258 dated Aug. 28, 2009.
International Search Report for International application No. PCT/KR2009/003432 dated Jan. 18, 2010.
International Search report for International application No. PCT/KR2009/003434 dated Jan. 18, 2010.
International Search report for International application No. PCT/KR2010/002333 dated Nov. 17, 2010.
International Search Report for International application No. PCT/KR2010/002336 dated Jan. 31, 2011.
International Search Report for International application No. PCT/KR2010/002338 dated Jan. 31, 2011.
International Search report for International application No. PCT/KR2010/002337 dated Jan. 31, 2011.
U.S. Appl. No. 12/511,530, filed Jul. 29, 2009 entitled Battery Module and Method for Cooling the Battery Module.
U.S. Appl. No. 12/511,552, filed Jul. 29, 2009 entitled Battery Module and Method for Cooling the Battery Module.
U.S. Appl. No. 12/549,766, filed Aug. 28, 2009 entitled Battery Module and Method for Cooling the Battery Module.
U.S. Appl. No. 12/794,949, filed Jun. 7, 2010 entitled Battery Module and Methods for Bonding a Cell Terminal of a Battery to an Interconnect Member.
U.S. Appl. No. 12/857,908, filed Aug. 17, 2010 entitled Battery Cell Assemblies.
U.S. Appl. No. 12/861,364, filed Aug. 23, 2010 entitled Connecting Assembly.
U.S. Appl. No. 12/861,375, filed Aug. 23, 2010 entitled attery System and Manifold Assembly Having a Manifold Member and a Connecting Fitting.
U.S. Appl. No. 12/861,381, filed Aug. 23, 2010 entitled End Cap.
U.S. Appl. No. 12/861,394, filed Aug. 23, 2010 entitled Battery System and Manifold Assembly With Two Manifold Members Removably Coupled Together.
U.S. Appl. No. 12/868,111, filed Aug. 25, 2010 entitled Battery Module and Methods for Bonding Cell Terminals of Battery Cells Together.
U.S. Appl. No. 13/073,000, filed Mar. 28, 2011 entitled Battery Disconnect Unit and Method of Assembling the Battery Disconnect Unit.
U.S. Appl. No. 13/076,774, filed Mar. 31, 2011 entitled Battery Pack Having Liquid Leak Detection System.
U.S. Appl. No. 12/165,100, filed Jun. 30, 2008 entitled Battery Cell Assembly Having Heat Exchanger with Serpentine Flow Path.
U.S. Appl. No. 12/164,780, filed Jun. 30, 2008 entitled Battery Module Having Battery Cell Assembly with Heat Exchanger.
U.S. Appl. No. 12/164,627, filed Jun. 30, 2008 entitled Liquid Cooled Battery Manifold Assembly with Flow Balancing Feature.
U.S. Appl. No. 12/246,073, filed Oct. 6, 2008 entitled Battery Cell Carrier That Engages Side Walls of Active Cell.
U.S. Appl. No. 12/164,445, filed Jun. 30, 2008 entitled Battery Module Having a Rubber Cooling Manifold.
U.S. Appl. No. 12/016,630, filed Jan. 18, 2008 entitled Battery Cell Assembly and Method for Assembling the Battery Cell Assembly.
U.S. Appl. No. 12/258,696, filed Oct. 27, 2008 entitled Battery Module Having Cooling Manifold with Ported Screws and Method for Cooling the Battery Module.
U.S. Appl. No. 12/433,155, filed Apr. 30, 2009 entitled Cooling System for a Battery and a Method for Cooling the Battery System.
U.S. Appl. No. 12/433,427, filed Apr. 30, 2009 entitled Cooling Manifold and Method for Manufacturing the Cooling Manifold.
U.S. Appl. No. 12/433,534, filed Apr. 30, 2009 entitled Battery Systems, Battery Modules, and Method for Cooling a Battery Module.
U.S. Appl. No. 12/433,397, filed Apr. 30, 2009 entitled Battery Systems, Battery Modules, and Method for Cooling a Battery Module.
U.S. Appl. No. 12/164,741, filed Jun. 30, 2008 entitled Battery Module Having Battery Cell Assemblies with Alignment-Coupling Features.
U.S. Appl. No. 12/433,485, filed Apr. 30, 2009 entitled Battery Systems, Battery Module and Method for Cooling the Battery Module.

\* cited by examiner

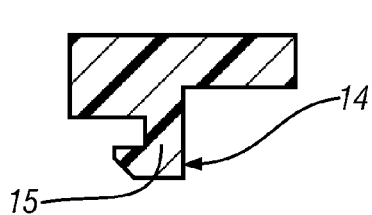
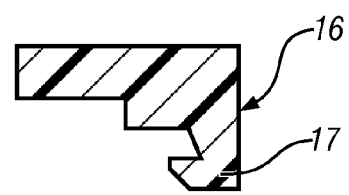
*FIG. 2*        *FIG. 3*
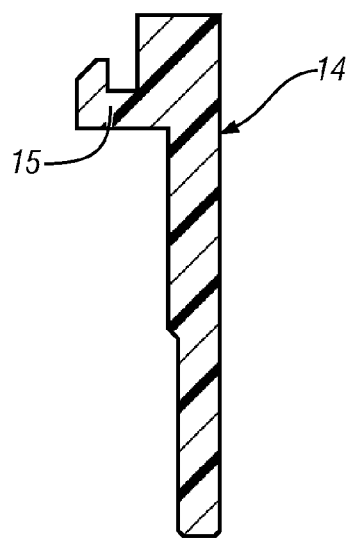
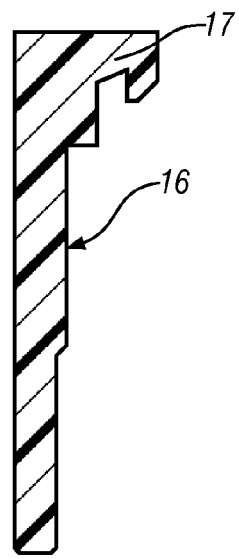
*FIG. 4*        *FIG. 5*
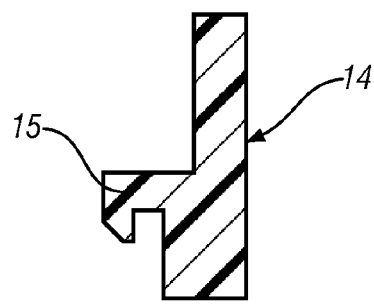
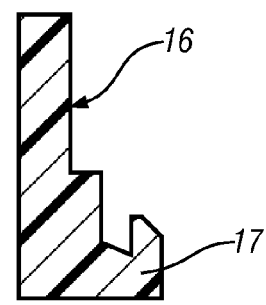
*FIG. 6*        *FIG. 7*

FRAME MEMBER, FRAME ASSEMBLY AND BATTERY CELL ASSEMBLY MADE THEREFROM AND METHODS OF MAKING THE SAME

TECHNICAL FIELD

This invention relates generally to a battery cell frame member, frame assembly and battery cell assembly made therefrom, and methods of making the same.

BACKGROUND OF THE INVENTION

The invention solves two problems: the problem of stacking and aligning multiple battery cell holding frames for assembly and use in service, and the problem of flexibility to use different cooling methods.

The expanded use of high energy density batteries, such as Lithium-Polymer (LiPo) batteries, for a variety of relatively new applications, including various vehicular applications, such as automotive use in gas-electric and diesel-electric hybrid vehicles and plug-in electric vehicles, has placed increased demands on the battery technology, particularly the packaging technology for these batteries. Since a relatively large number of relatively large sized battery cells must be packaged together for use in battery modules for use in these applications, the development of low cost packaging technology that is particularly suited to high volume manufacturing and assembly of these battery modules is very important to the successful commercialization of this technology.

Previous packaging technology has been relatively complex, requiring numerous parts to assembly the battery cells into battery modules. These include several different plastic frames and supports used to capture cells, and then further assembly of a plurality of packaged cells containing these parts, including the use of numerous fasteners in conjunction with the assembly of plastic frames and associated frame components. They have also included molding plastic flanges or other features around the edges of, or over the entire surface of, each of the cells used in the battery module. Such molding procedures are generally undesirable due to the potential for damaging the battery cells, as well as the enhanced material and labor costs associated with molding, testing and inspecting such features.

Previously, the incorporation of alignment features into frames and associated components has been utilized to aid the assembly process, but this has been limited due to the sometimes cumbersome integration of these features, particularly in view of the number of parts that have been utilized to form and assemble battery frames and modules.

Previously, the need to incorporate cooling into the battery modules has also been difficult due to the large number of components involved in the assembly and the complexity added to the assembly thereby, as well as the need to maintain cooling in the assembly and minimize coolant leakage while also providing the needed thermal coupling in these complex assemblies. Because of the complexity associated with prior cooling schemes, alteration of the cooling system, including changes to the cooling apparatus and method employed has required significant redesign of the battery module. Thus, if the cooling load of the module was higher than anticipated, making changes to the cooling system has been difficult, generally requiring significant tooling changes, requalification of the cooling system and the like.

Thus, it is desirable to develop improved components for packaging battery modules having designs and materials that enable more simplified assembly and more versability for cooling the resultant modules while also providing the desired cost, structural, mechanical, thermal and other properties to the assembly.

SUMMARY OF THE INVENTION

In general terms, this invention provides a frame member for housing a battery cell. The frame member includes an integral frame having a peripheral wall, the peripheral wall having an attachment face and an opposed cooling face. The frame member also includes an attachment feature located on the attachment face, and a complementary attachment feature located on the attachment face that is symmetrically opposed to the attachment feature about a plane of symmetry of the frame, the peripheral wall defining an opening that is configured to matingly receive a battery cell therein.

Further, this invention also provides a frame assembly for housing a battery cell. The frame assembly includes a first integral frame having a peripheral wall, the peripheral wall having an attachment face and an opposed cooling face, an attachment feature located on the attachment face and a complementary attachment feature located on the attachment face that is symmetrically opposed to the first attachment feature about a plane of symmetry of the frame, the peripheral wall defining an opening that is configured to matingly receive a battery cell therein. The frame assembly also includes a second integral frame having a peripheral wall, the peripheral wall having an attachment face and an opposed cooling face, an attachment feature located on the attachment face and a complementary attachment feature located on the attachment face that is symmetrically opposed to the first attachment feature about a plane of symmetry of the frame, the peripheral wall defining an opening that is configured to matingly receive a battery cell therein. The frame assembly also includes a cooling member having a first side and a second side, the first side attached to the attachment face of the first frame and covering the first opening, the second side attached to the attachment face of the second frame and covering the second opening.

Still further, this invention also includes a method of making a frame member for housing a battery cell. The method includes forming an integral frame having a peripheral wall, the peripheral wall having an attachment face and an opposed cooling face, and an attachment feature located on the attachment face and a complementary attachment feature located on the attachment face that is symmetrically opposed to the attachment feature about a plane of symmetry of the frame, the peripheral wall defining an opening that is configured to matingly receive a battery cell therein.

Still further, this invention also includes a method of making a frame assembly for housing a battery cell. The method includes forming a first integral frame having a peripheral wall, the peripheral wall having an attachment face and an opposed cooling face, an attachment feature located on the attachment face and a complementary attachment feature located on the attachment face that is symmetrically opposed to the first attachment feature about a plane of symmetry of the frame, the peripheral wall defining an opening that is configured to matingly receive a battery cell therein. The method also includes forming a second integral frame having a peripheral wall, the peripheral wall having an attachment face and an opposed cooling face, an attachment feature located on the attachment face and a complementary attachment feature located on the attachment face that is symmetrically opposed to the first attachment feature about a plane of symmetry of the frame, the peripheral wall defining an opening that is configured to matingly receive a battery cell therein. The method also includes forming a cooling member having a first side and a second side. The method also included attaching the first side of the cooling member to the attachment face of the first frame, thereby covering the first opening; and attaching the second side of the cooling member to the attachment face of the second frame, thereby covering the second opening.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 2 is a cross-sectional view along section 2-2 of FIG. 1;
FIG. 3 is a cross-sectional view along section 3-3 of FIG. 1;
FIG. 4 is a cross-sectional view along section 4-4 of FIG. 1;
FIG. 5 is a cross-sectional view along section 5-5 of FIG. 1;
FIG. 6 is a cross-sectional view along section 6-6 of FIG. 1;
FIG. 7 is a cross-sectional view along section 7-7 of FIG. 1.

DETAILED DESCRIPTION OF AN EXEMPLARY EMBODIMENT

Figure 1:
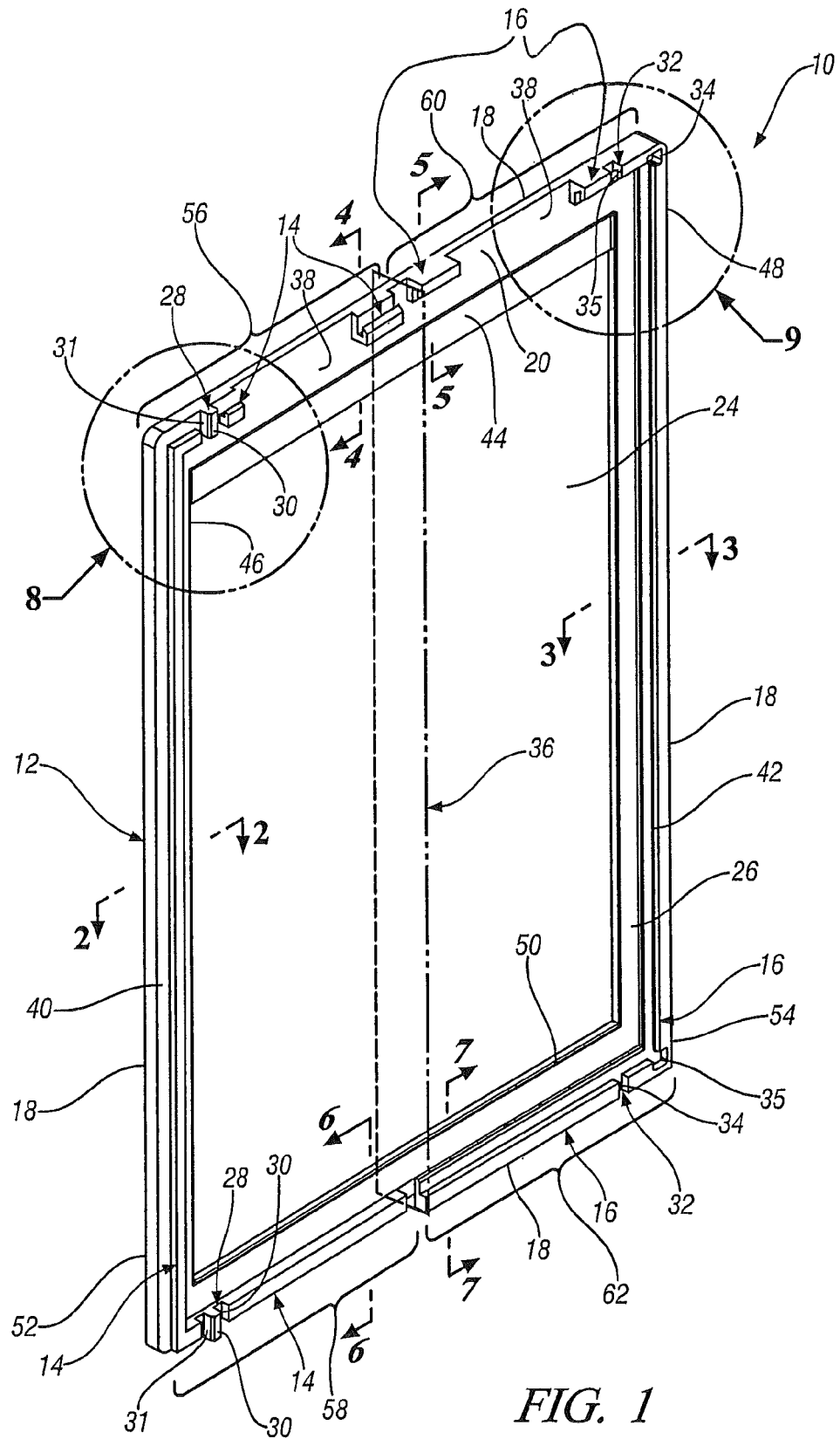
FIG. 1 is a perspective view of an exemplary embodiment of a frame member as disclosed herein.
Figure 8:
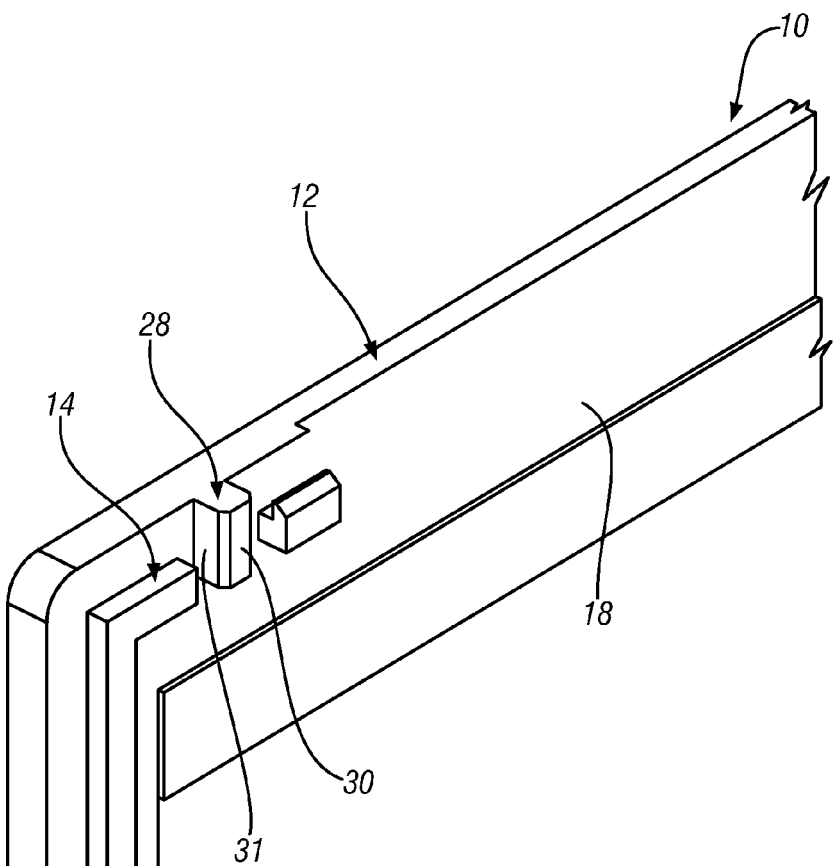
FIG. 8 is an enlarged perspective view of region 8 of FIG. 1.
Figure 9:
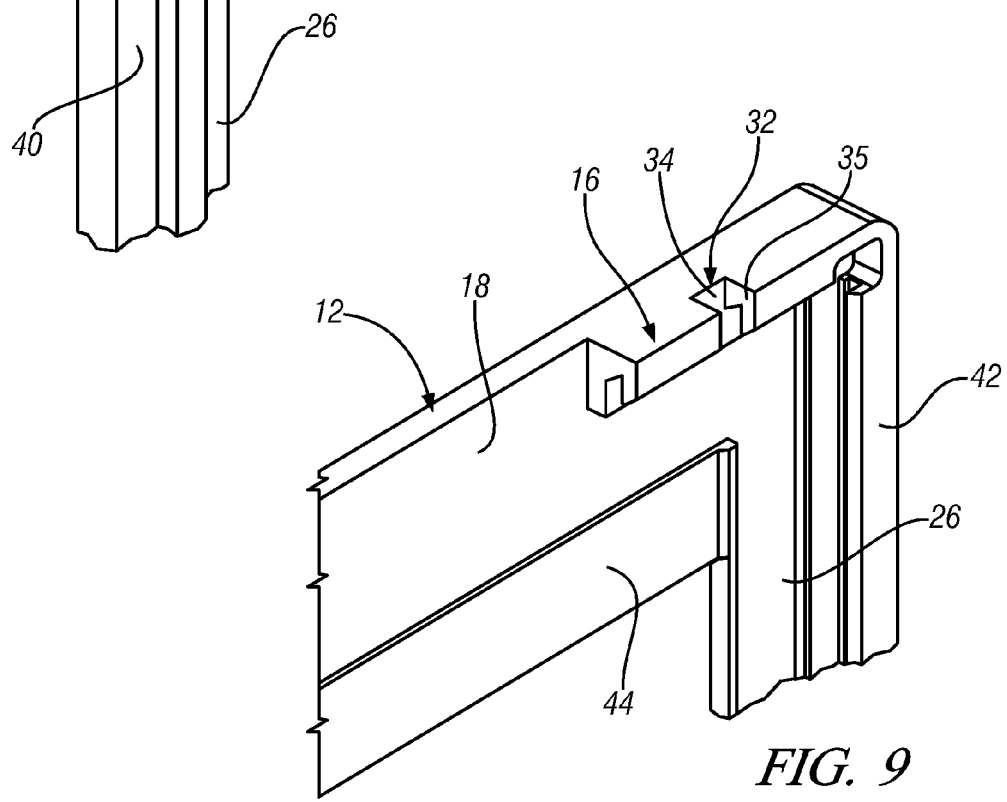
FIG. 9 is an enlarged perspective view of region 9 of FIG. 1.

Referring to FIGS. 1-18, and more particularly to FIG. 1, a frame member 10 for housing a battery cell 100 (see FIGS. 14-18) is disclosed. Frame member 10 includes an integral frame 12, an attachment feature 14 and a complementary attachment feature 16. Integral frame 12 includes peripheral wall 18 that encloses the frame. Peripheral wall 18 includes attachment face 20 and an opposed cooling face 22. Opposed cooling face 22 and attachment face 20 define opposite sides of peripheral wall 18. Peripheral wall 18 also includes an opening that is configured to receive battery cell 100 therein by having a size and shape that is adapted to receive the cell. At least one of opening 24 and battery cell 100 are configured for mating engagement. This may include, for example, providing a rim 26 around all or some portion of opening 24. It may also include provision of a cell flange 102, or a plurality of flanges 102, around the periphery of battery cell 100 or a raised central portion 104, or raised central portions 104, or a combination thereof.

Integral frame 12 may also include an alignment feature 28, or a plurality of alignment features 28, such as a protrusion 30 in the form of raised tab 31. In conjunction with alignment feature 28, integral frame 12 may also include a complementary alignment feature 32, or a plurality of complementary alignment features 32, corresponding to the plurality of alignment features 28, such as recess 34 in the form of recessed slot 35. Protrusion 30 extends above the adjacent portions of attachment face 20. Similarly, recess 34 is recessed with respect to the adjacent portions of attachment face 20. Alignment feature 28, such as protrusion 30 in the form of raised tab 31, is configured to cooperate with complementary alignment feature 32 such as recess 34 in the form of recessed slot 35, to provide alignment of adjacent frame members 10 in conjunction with their assembly, as described herein. Both attachment feature(s) 14 and complementary attachment feature(s) 16, and alignment feature(s) 28 and complementary alignment feature(s) 32, are located on attachment face 20 and are symmetrically disposed about plane of symmetry 36 such that the respective feature(s) and complementary feature(s) are symmetrically opposed to one another on opposite sides of plane 36. This arrangement is particularly advantageous because by suitable selection and symmetric arrangement of the respective feature(s) and complementary feature(s) a plurality of identical frame members 10 may be aligned with one another and attached to one another as further described herein. The use of a single frame member 10 is advantageous as it simplifies the design and manufacture and use of frame member 10, including reducing the number of different parts required for assembly of frame assemblies, frame/battery cell assemblies and battery modules that utilize frame members 10 in the manner described herein.

In an exemplary embodiment, integral frame 12 may also include an electrode channel 38 located in the attachment face 20 along peripheral wall 18. The electrode channel extends from opening 24 outwardly through attachment face 20 to the periphery of integral frame 12. Electrode channel 38 is configured with a size and shape (e.g., width and length), including a depth, sufficient to receive an electrode 106 of battery cell 100 (see FIGS. 14-18). As a typical configuration of battery cell 100 includes two electrodes 106, e.g., 106+ and 106−, having opposite polarity, an exemplary embodiment as shown in FIGS. 14-18 may include two electrode channels 38. Alternately, a single electrode channel may be configured, particularly with respect to its width, in order to receive two electrodes 106 in a single channel. Further, since frame member 10 may be configured to receive a plurality of battery cells 100, including a plurality of battery cells 100 having electrodes 106 extending outwardly in different directions, attachment face 20 may include a corresponding plurality of electrode channels 38, including any desired number of electrode channels 38. In an exemplary embodiment, whether integral frame 12 includes a single extended electrode channel 38 or plurality of electrode channels 38, at least two of the channel(s) may be symmetrically disposed opposite one another about a plane of symmetry 36, analogous to the complementary relationships described above for attachment features and alignment features, so that when two adjacent frame members 10 are attached to one another, a channel 38 of one frame member 10 and its complementary channel 38 of the other frame member 10 are aligned, thereby doubling the thickness of channel 38.

Frame member 10 may have any form such that peripheral wall 18 has any suitable close-form shape, including the shape of a regular or irregular polyhedron, circle, semi-circle, chord, ellipse, semi-ellipse or other curved closed-form shape. A particularly useful shape with regard to ease of manufacture, packing density, packaging of a plurality of frame members and dynamic stability thereof is a regular polyhedron, particularly a rectangle. As illustrated in FIG. 1, peripheral wall 18 includes a first side wall 40 and an opposed second side wall 42, an upper wall 44 extending between the upper end 46 of first side wall 40 and the upper end 48 of second sidewall 42. Peripheral wall 18 also includes lower wall 50 extending between lower end 52 of first sidewall 40 and the lower end 54 of second side wall 42. As noted, peripheral wall 18 and respective first side wall 40, second side wall 42, upper wall 44 and lower wall 50 are integral, i.e., are formed together. Integral peripheral wall 18 may be formed by any suitable forming method, including various types of molding. Engineering plastics, including thermoset polymers or thermoplastic polymers, or a combination thereof, including various copolymers, filled polymers and the like may be used. A suitable molding method is injection molding. An example of a suitable engineering plastic is acrylonitrile butadiene styrene (ABS).

Referring to FIGS. 1-9, depending on the shape of frame member 10, various arrangements of attachment feature 14 and complementary attachment feature 16 may be used. As shown in FIG. 1, attachment feature 14 extends around the perimeter of opening 24 and extends along a first portion 56 of upper wall 44 and away from plane 36 to first side wall 42, and thereafter downwardly along first side wall 42 to a first portion 58 of lower wall 50, and thereafter along first portion 58 of lower wall 50 toward plane 36. Similarly, complementary attachment feature 16 extends away from plane 36 along an opposed (with reference to attachment feature 14) second portion 60 of upper wall 44, and thereafter downwardly along second side wall 42 to a second portion 62 of lower wall 50, and thereafter along the second portion 62 of lower wall 50 toward plane 36. It is desirable that a portion (e.g., first portion 56) of attachment feature 14 be located substantially opposite another portion of attachment feature 14 (e.g., second portion 58) along peripheral wall 18 and substantially opposite one another across opening 24. It will be understood from FIGS. 1-9, 13 and 15-18, that this arrangement provides at least two opposed points of closure along the perimeter of wall 18 of adjacent frame members 10. To ensure the secure attachment of the frame members 10 to one another, and the capture of a battery cell 100, or battery cells 100, between them. Another desirable configuration as illustrated in these Figures is provision of an attachment feature 14, or features, that extends around a first portion of the perimeter of opening 24, such as about one half, and a complementary attachment feature 16, or features, that extends around a second portion of the perimeter of opening 24, such as about the other one half. Such an arrangement provides closure between adjacent frame members 10 along substantially all of the perimeter of opening 24, excepting those portions associated with electrode channel(s) 38, alignment feature 28, or features 28, and complementary alignment feature 32, or complementary alignment features 32. Attachment feature 14 and complementary attachment feature 16 may have any suitable configuration that provides for an attachable engagement of, and secure attachment of, adjacent frame members 10. This includes all manner of male/female attachment features, where a protruding portion may be attachably engaged with a mating or complementary female portion. As illustrated in FIGS. 1-9, 12, 13 and 15-18, and particularly in FIGS. 1-9, attachment feature 14 may have an outwardly (with reference to opening 24) projecting L-shaped arm 15 and complementary attachment feature 16 may include an inwardly (with reference to opening 24) projecting L-shaped arm 17, wherein (see FIG. 13) the respective L-shaped arms 15, 17 are configured to engage one another in an overlapping and locking arrangement when adjacent frame members 10 are positioned to place attachment features 14 and complementary attachment features 16 proximate one another (see FIG. 13) and press them together in the directions shown by first direction arrows 56 and second direction arrows 58. The respective and complementary L-shaped arms 15, 17 of features 14, 16 are configured to flex outwardly and inwardly as the case may be, and ride over one another such that the outwardly and inwardly extending arms overlap one another and provide locking engagement of the frame members 10 with which they are associated.

Figure 10:
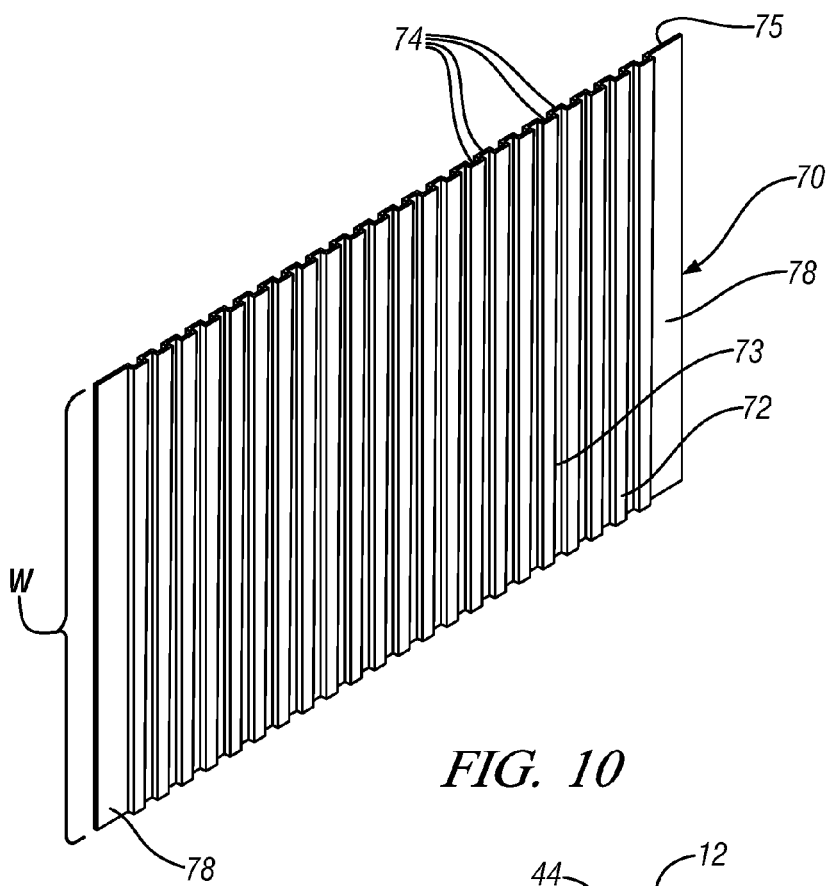
FIG. 10 is a perspective view of a first exemplary embodiment of a cooling member as disclosed herein.
Figure 11:
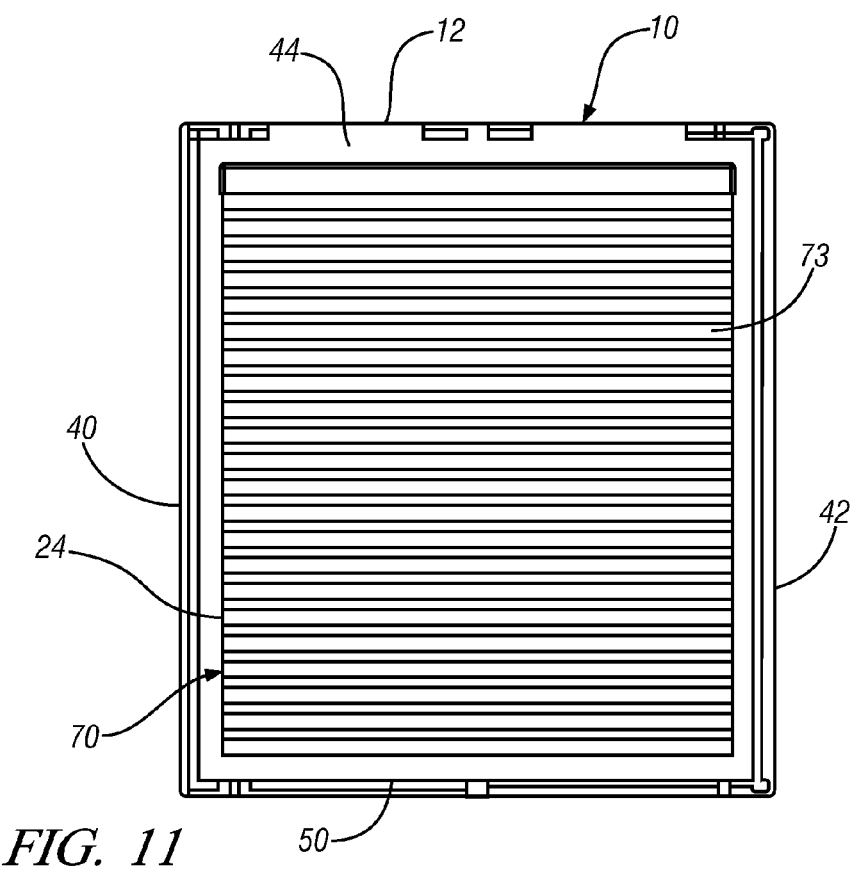
FIG. 11 is a front view of an exemplary embodiment of a frame assembly as disclosed herein.
Figure 12:
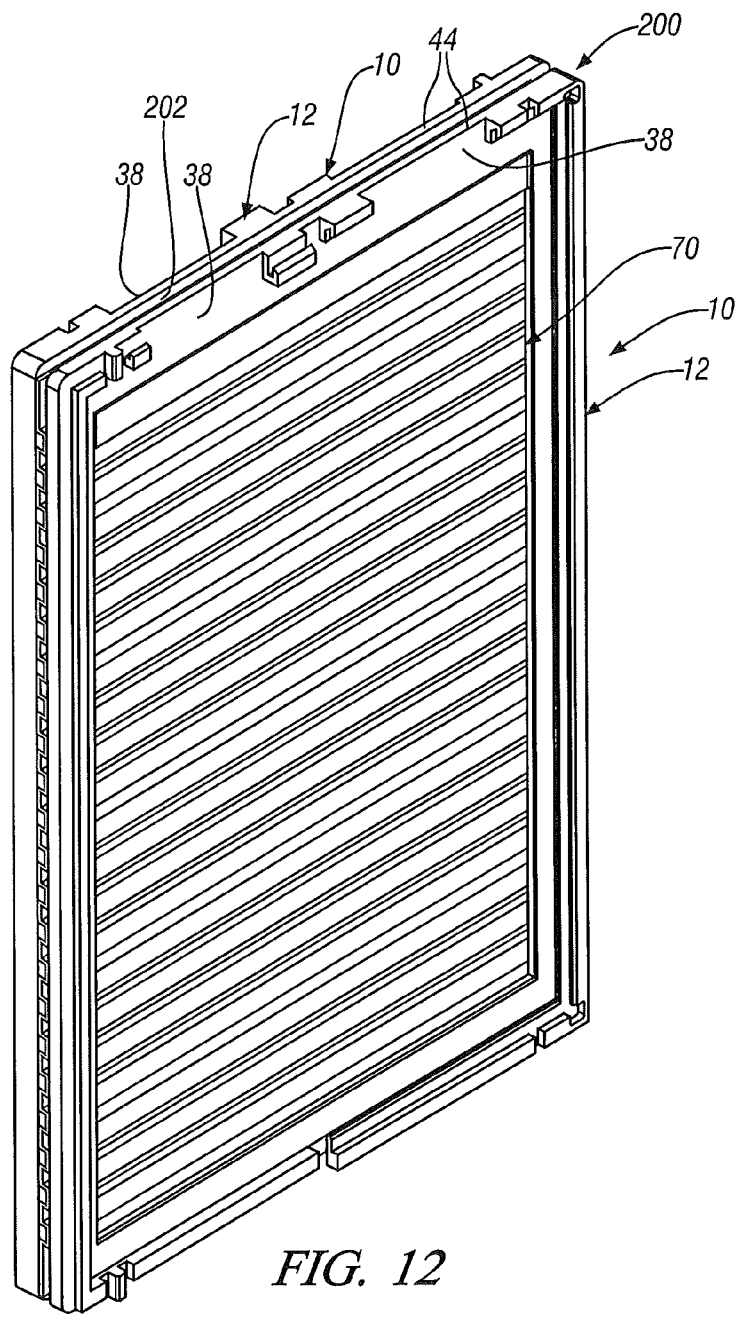
FIG. 12 is a perspective view of the frame assembly of FIG. 11.
Figure 13:
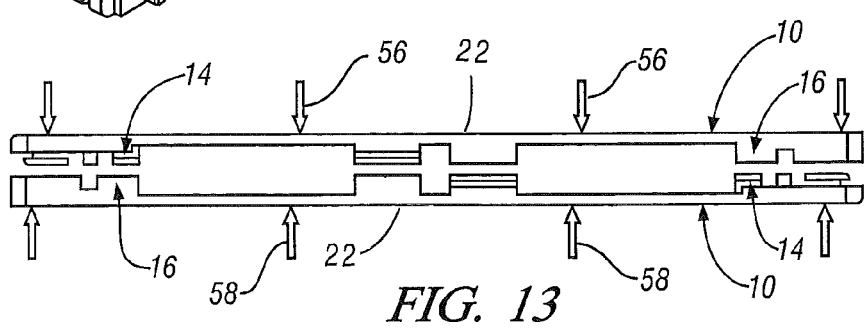
FIG. 13 is a top view of a pair of frame members of the type shown in FIG. 1 having their respective attachment features and complementary attachment features aligned, prior to the attachable engagement thereof.
Figure 14:
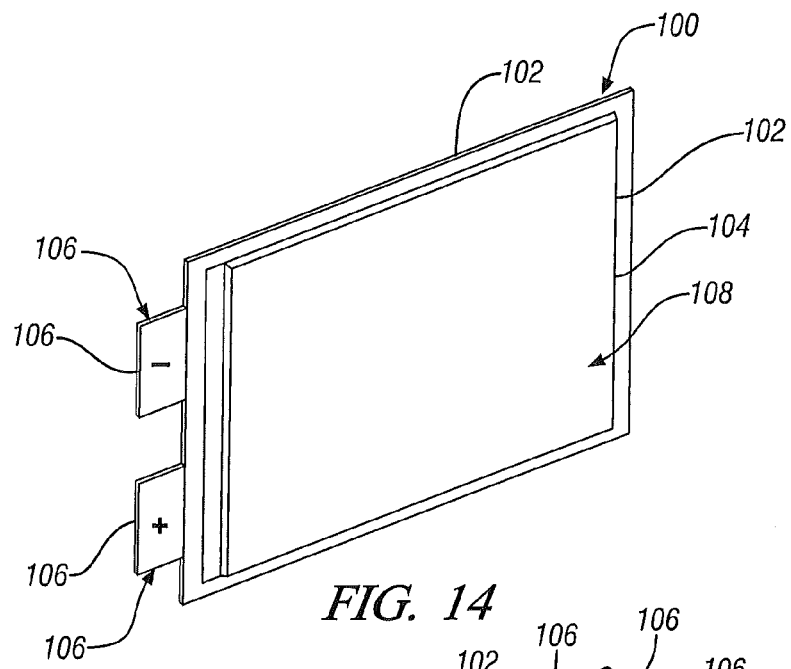
FIG. 14 is an exemplary embodiment of a battery cell as disclosed herein.
Figure 15:
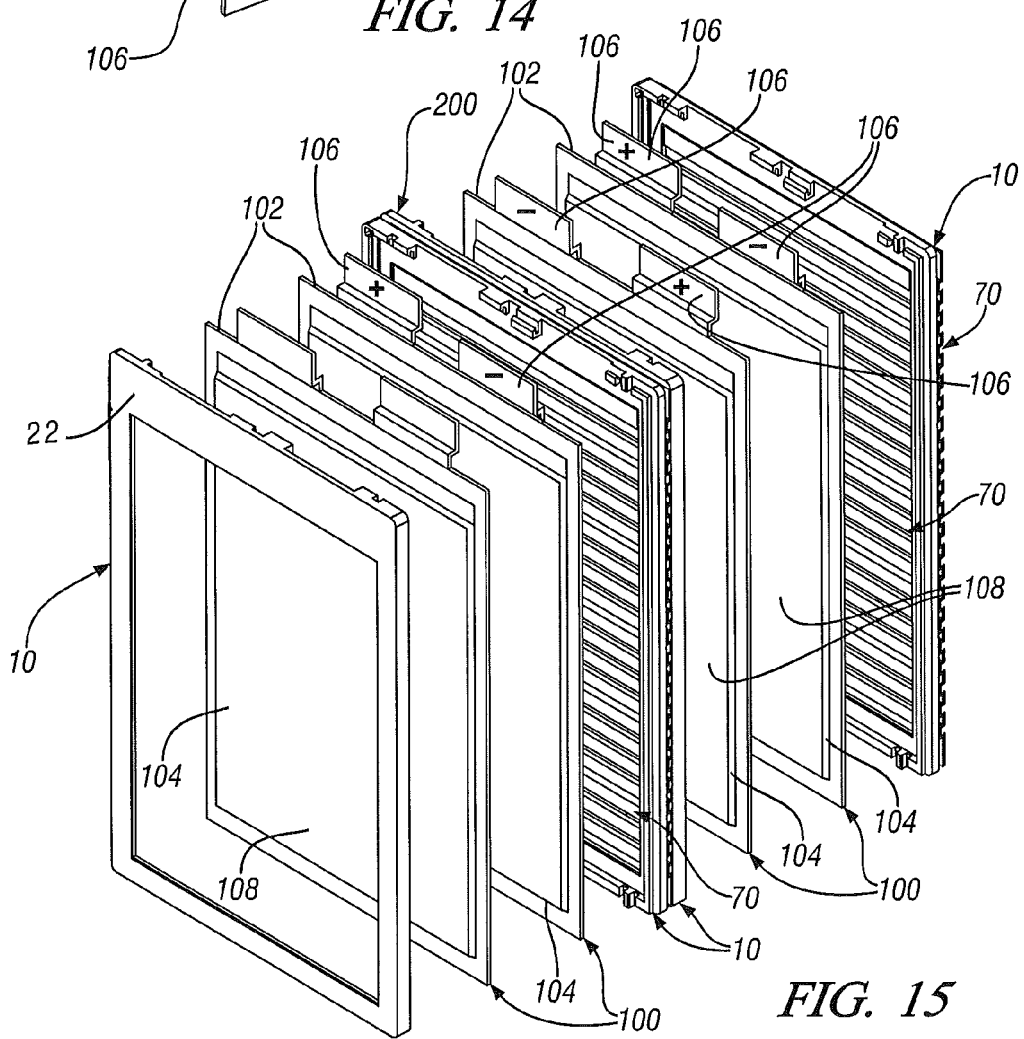
FIG. 15 is an exploded perspective view of an exemplary embodiment of a frame/battery cell assembly and battery module as disclosed herein.

In order to use frame member 10 in the construction of a battery module 400 it is necessary to also include elements into the module that provide cooling. Referring to FIGS. 10-18, cooling may be provided for battery module 400 by incorporation of cooling member 70. Referring particularly to FIG. 10, cooling member 10 may include a thermally conductive corrugated sheet 72. Corrugated sheet 72 has a plurality of channels 74 that extend across the width (w) thereof. Cooling channels 74 cooperate with other elements of the battery module 400, including battery cell 100 and frame members 10 to provide a corresponding plurality of cooling conduits and associated flow paths for circulation of a cooling fluid, such as air, through the battery module 400 for cooling thereof, as described herein.

Figure 16:
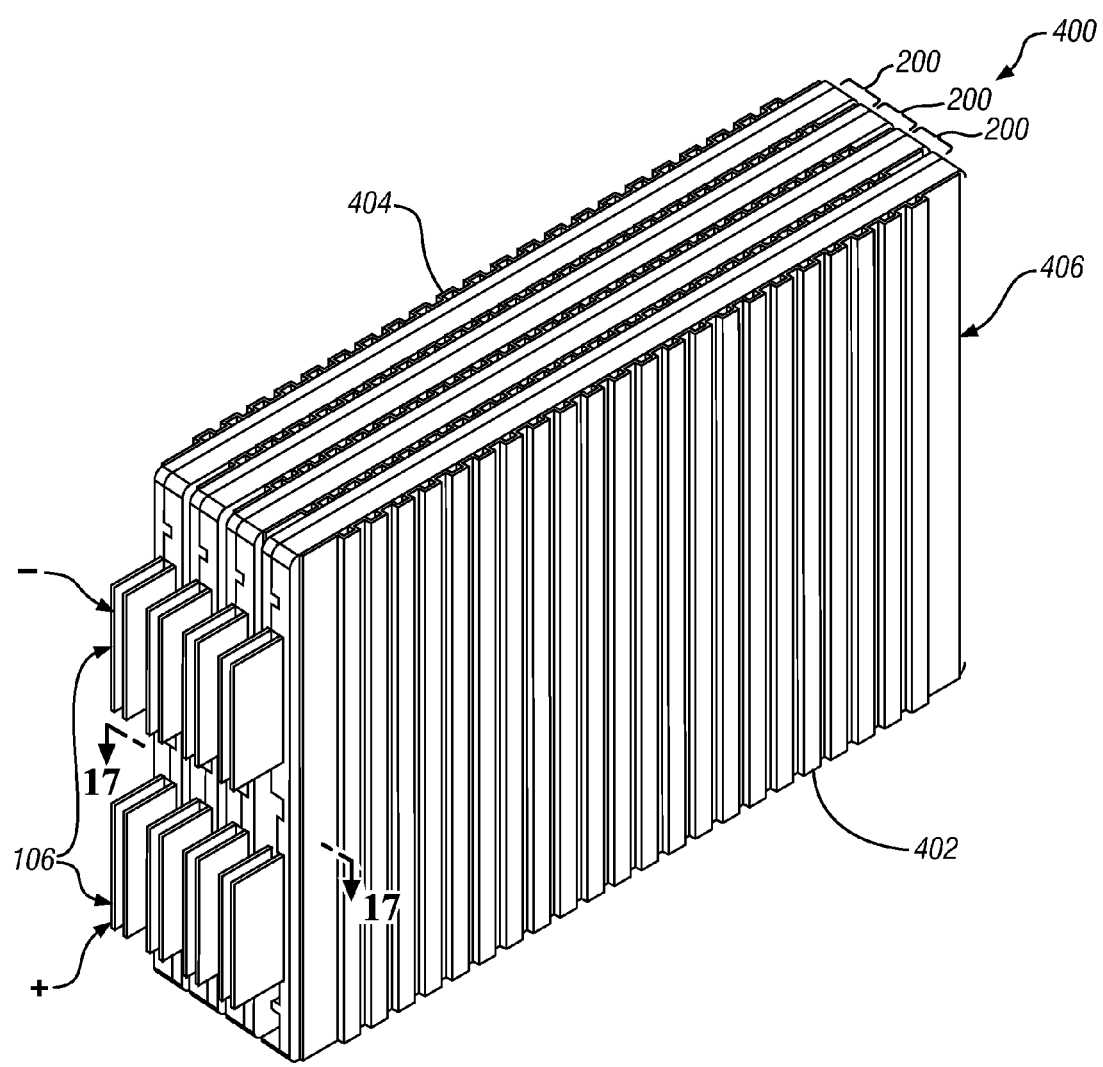
FIG. 16 is a perspective view of a second exemplary embodiment of a frame/battery cell assembly and battery module as disclosed herein.
Figure 17:
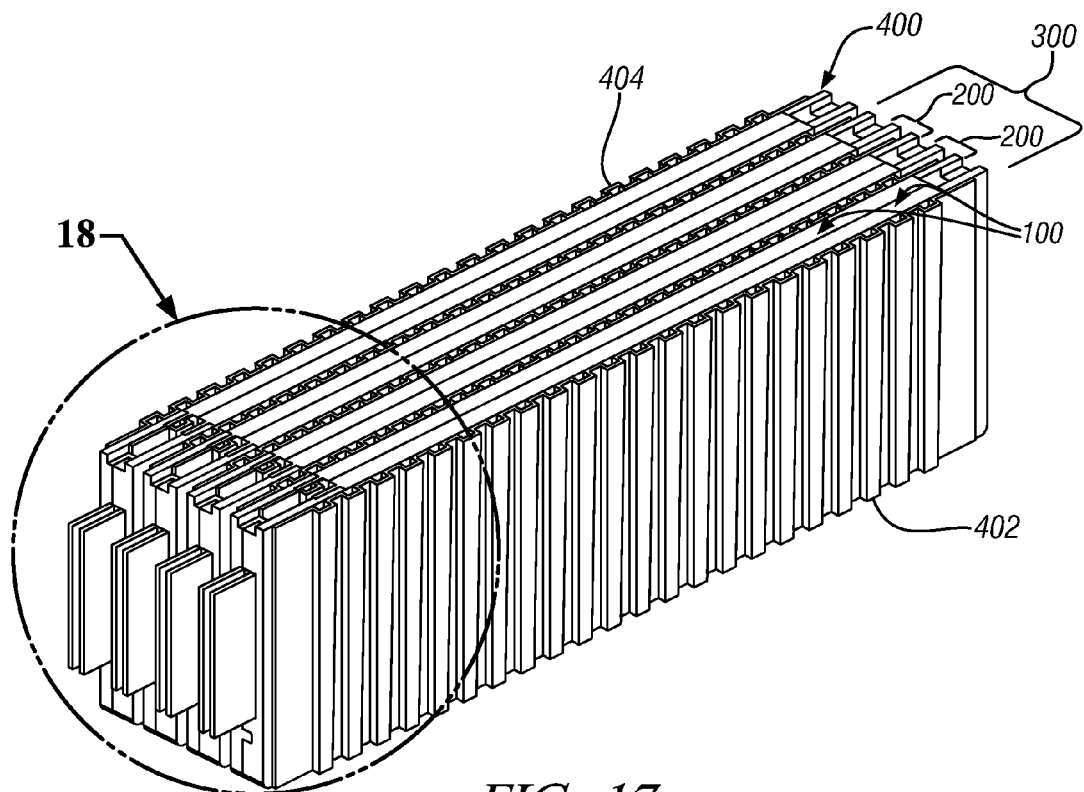
FIG. 17 is a cross-sectional perspective view along section 17-17 of FIG. 16.
Figure 18:
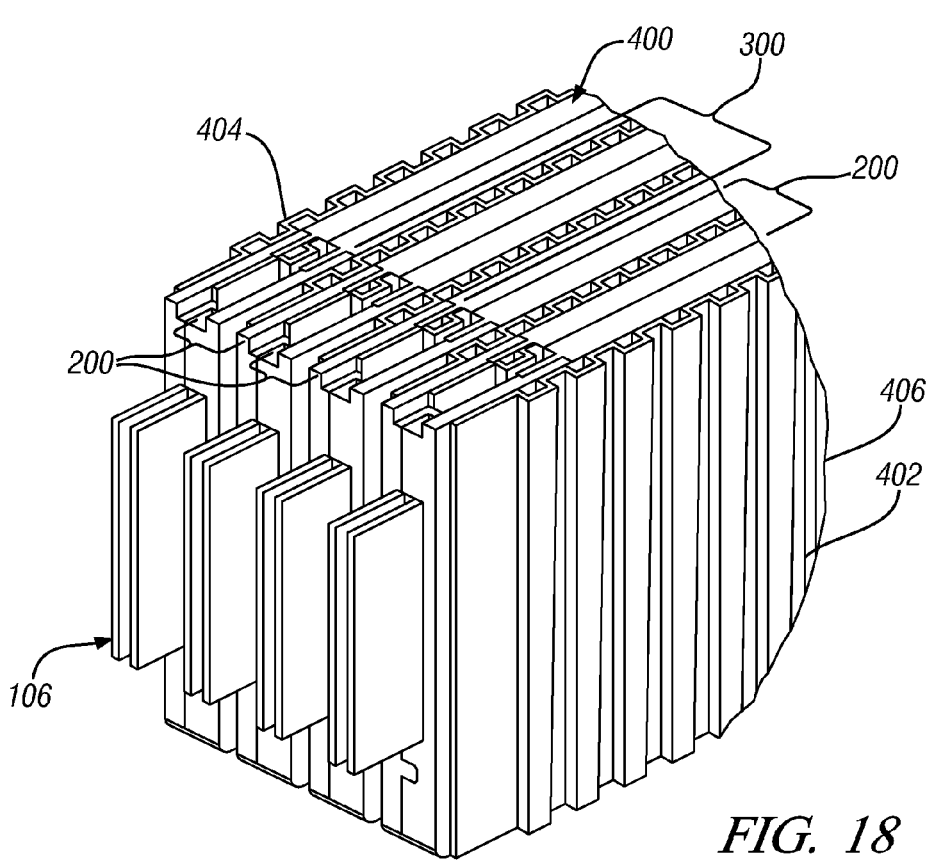
FIG. 18 is an enlarged cross-sectional perspective view of region 18 of FIG. 17.

Cooling member 70 may be formed of any suitable conductive material, including various metals and metal alloys, such as aluminum, as well as other thermally conductive materials, such as various thermally conductive polymers or metal polymer composites. Cooling member 70 may be formed by any suitable method. When cooling member 70 includes a metal or metal alloy, metal stamping may be used to form cooling member 70, including cooling channels 74. Cooling member 70 will have a size and shape sufficient to enclose at least a portion of opening 24. In one embodiment, cooling member 70 has a size and shape sufficient to completely enclose opening 24, as shown in FIGS. 11, 12, 15 and 16-18. Cooling member 70 is configured to be attached to the cooling face 22 of frame 12, as shown in FIGS. 16-18. Cooling member 70 may be attached to cooling face 22 by forming a joint therebetween. Any suitable joint may be employed, including weld joints, adhesive joints and the like. These joints may be formed by ultrasonic welding, thermosonic welding, hot-platen welding, laser welding or adhesive bonding, or a combination thereof. The use of discrete fasteners to attach frame member 10 and cooling member 70 is also possible and within the scope of the joints contemplated herein. Cooling member 70 may be joined to cooling face 22 at the upper wall 44 and lower wall 50 by forming joints between them and attachment flanges 78 at either end of cooling member 70. Cooling member 70 and frame member 10 may also be joined along first side wall 40 and second side wall 42 by forming joints at the points of contact of cooling channel 74 and cooling face 22.

Following attachment of the first frame member 10 to the first surface 73 of cooling member 70, a second frame member 10 may be joined to an opposed second surface 75 of cooling member 70. The joints and joining methods employed may be the same as those employed to join first frame member 10 and cooling member 70, or different joints and joining methods may be employed. The first frame member 10, cooling member 70 and second frame member 10 joined in the manner described provide a frame assembly 200. An orientation of first frame member 10 and second frame member 10 so that both members have their respective upper walls 44 attached to the same end of cooling member 70 is particularly desirable as it provides an arrangement where all electrode channels 38 are located at an upper end 202 of frame assembly 200. However, due to the symmetric nature of frame members 10, an alternate arrangement is also possible (not shown) where first frame member 10 is attached with its upper wall 44 attached to one end of cooling member 70, and second frame member 10 has its upper wall attached to an opposite end of cooling member 70, such that electrode channels 38 of respective frame members 10 have their electrode channels 38 located on the opposite ends of cooling member 38.

Referring to FIGS. 15-18, first frame assembly 200 and a second frame assembly 200 together with at least one battery cell 100 may be used to provide a frame/battery cell assembly 300 and together define essential elements of a battery module 400, as illustrated in FIGS. 15-18. A particularly useful arrangement includes a first frame assembly 10, a second frame assembly 10 having two battery cells disposed there between with electrodes of the same polarity oriented toward opposite sides of frame assemblies 200. The battery cells are disposed such that their peripheral flanges 102 are disposed proximate rims 26. First frame assembly 200 and second frame assembly 200 may then be pressed together such that their respective attachment features 14 and complementary attachment features 16 engage one another in the manner described herein to fix first frame assembly 200 and second frame assembly 200 together thereby capturing the pair of battery cells 100 between them. In an exemplary embodiment, the frame members 10 and rims 26 and battery cells 100 and their respective peripheral flanges 102 are in pressing engagement with one another, such that rims 26 provide a compressive force against peripheral flanges 102 to secure and capture battery cells 100 within frame members 10. Further, the raised portions 104 of battery cells 100 are located within openings 24 of frame members 10. With the surfaces 108 of raised portions 104 in pressing engagement with the respective surfaces of cooling member 70, and particularly with the base portions of cooling channels 74, such that the cell surfaces 108 are thermally coupled to the cooling member 70 that they are proximate to promote cooling of the battery cells 100 during operation of battery module 400. With the advantageous thermal coupling of battery cells 100 and cooling member 70, a cooling fluid, such as air, may be passed through cooling channels 74 to provide enhanced heat transfer and cooling of battery module 400.

The use of frame assemblies 200 to form frame/battery cell assemblies 300 provides for modular construction of battery modules 400, such that any number of frame assemblies 200 and battery cells 100 may be combined in the manner described herein to make battery modules 400 that include a plurality of frame/battery cell assemblies 300, in any desired number. This high degree of modularity allows any number of cells to be assembled into battery modules to provide a desired power (kW) and energy (kW/hr) output. It is particularly advantageous that this modularity enables construction of battery modules 400 of any desired power and energy output with essentially no tooling changes associated with the manufacture of battery module 400. Only minimal tooling and component changes are required, such as the provision of suitable interconnects for the various module configurations, or changes in related structures necessary to provide cooling fluid to battery modules of various sizes and shapes.

Figures 19, 20:
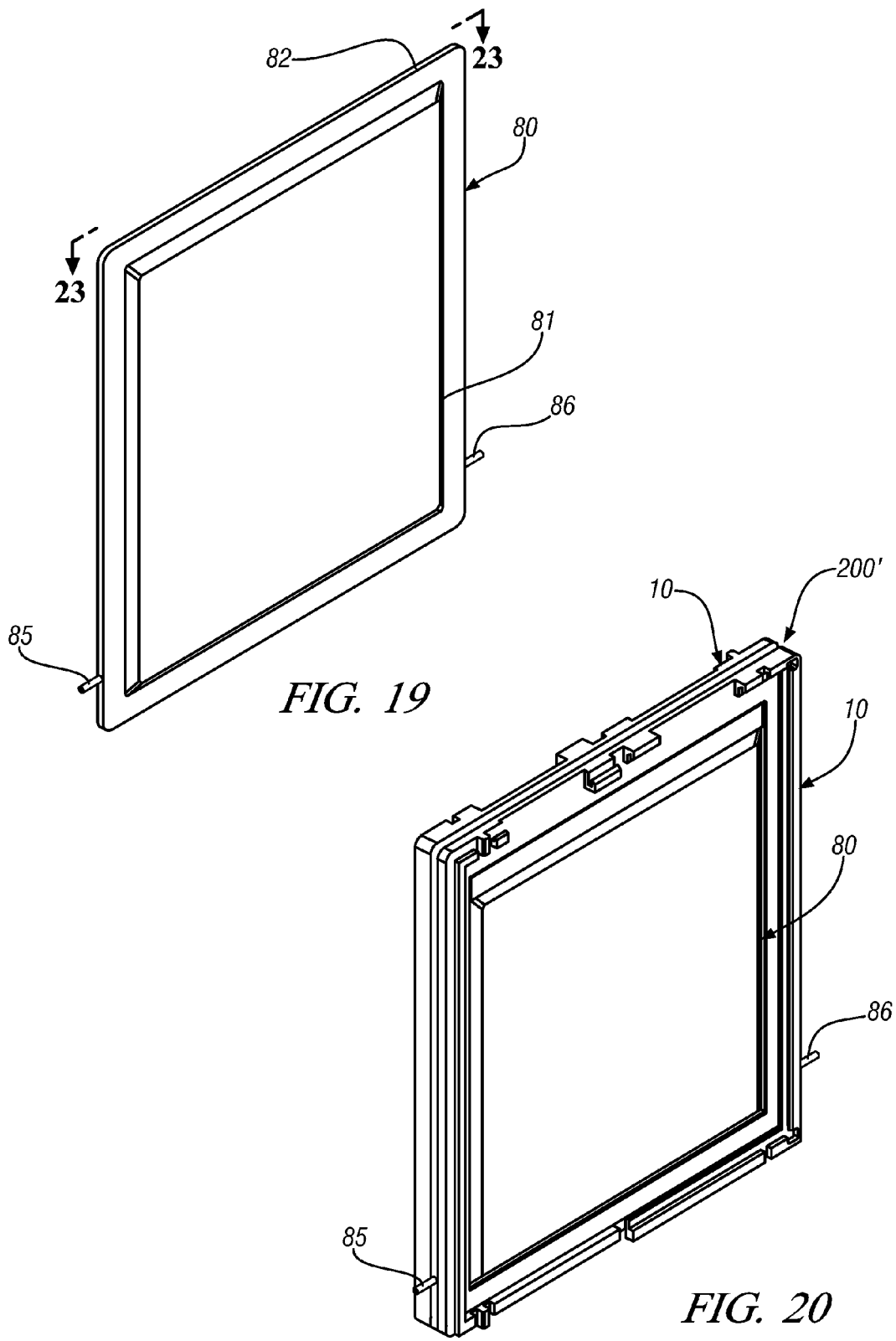
FIG. 19 is a perspective view of a second exemplary embodiment of a cooling member as disclosed herein.
FIG. 20 is a perspective view of a second exemplary embodiment of a frame assembly as disclosed herein.
Figure 23:
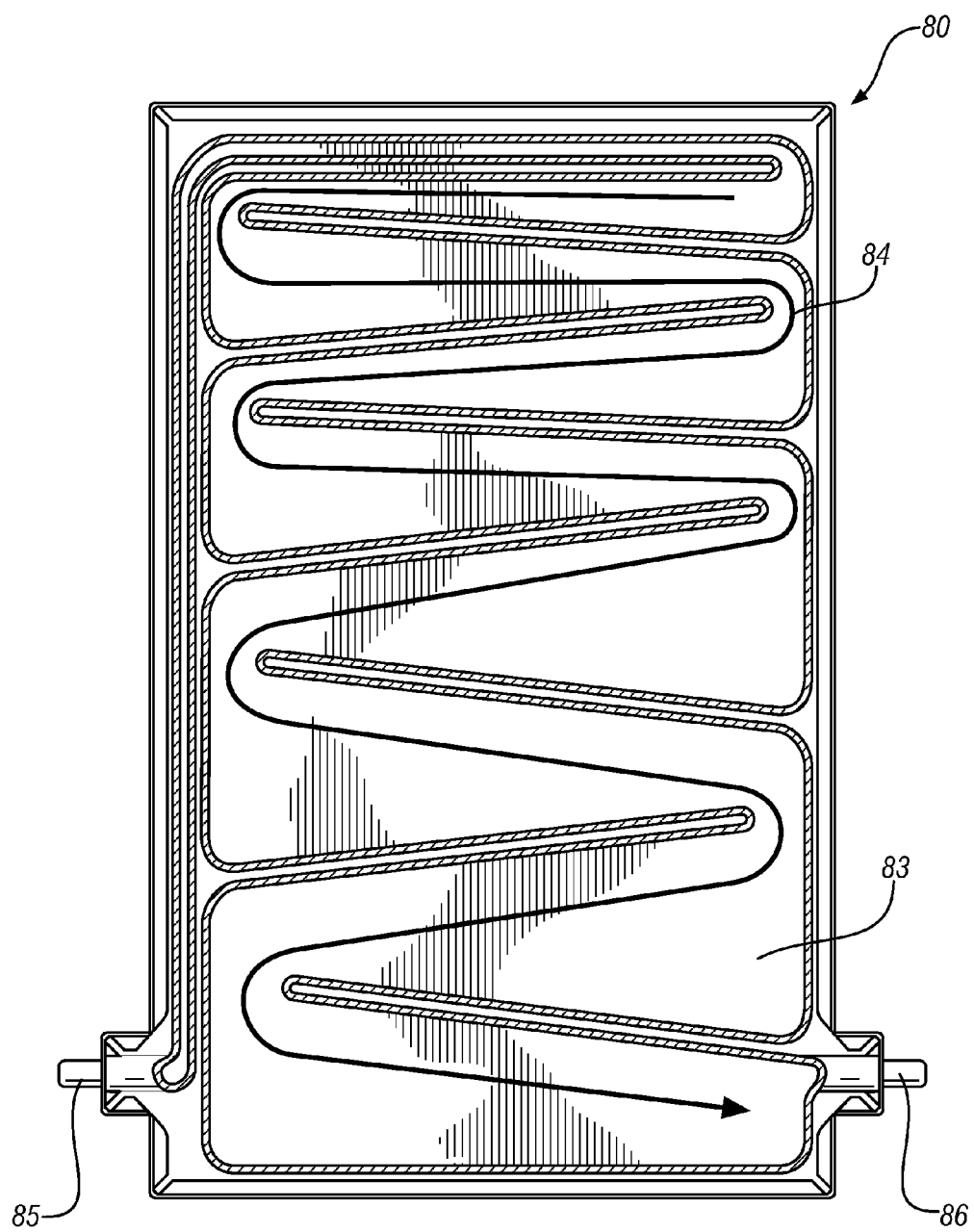
FIG. 23 is a cross-sectional view along section 23-23 of FIG. 19.

As may be understood from FIGS. 15-18, on the ends 402 and 404 of battery module 400, it may be desirable to incorporate a module cover 406. The module cover may be formed by assembling a single frame member 10 to a cooling element 70 in the manner described herein. Use of module cover 406 enables capture of a pair of battery cells between a frame assembly 200 and cover 406 in the same manner as described herein with respect to use of a pair of frame assemblies 200 to capture a pair of battery cells 100 as described herein. The use of covers 406 with adjacent frame assemblies 200 provides the same cooling functionality as described herein with respect to the pair of frame assemblies 200 and battery cells 100, but it avoids wasting a frame member 10 on the ends of battery module 400 as would be the case if frame assemblies 200 were used on the ends of battery module 400. Referring to FIGS. 19, 20 and 23, a second exemplary embodiment of a cooling member 80 is disclosed. Cooling member 80 includes first side 81 and an opposite side 82 in the form of sheets, such as metal sheets. Side 81 and side 82 are joined to define a housing 83 and a flow passage extending there between 84. Flow passage 84 extends from an inlet port 85 to an outlet port 86. Side 81, side 82, or both of them, may be formed, such as by metal stamping, to define a shape of flow passage 84, as well as inlet 85 and outlet 86. Flow passage 84 may have any suitable shape, including a serpentine shape. Cooling member 80 is adapted for passage of a cooling fluid from inlet 85 to outlet 86 along flow passage 84 to promote cooling of battery cells 100 in the manner described herein. Suitable cooling fluid may include various liquids, such as water, or various aqueous solutions. Cooling member 80 may be joined to frame members 10 in the manner described herein with regard to cooling member 70 to form a frame assembly 200'. A plurality of frame assemblies 200' may be utilized in conjunction with battery cells 100 in the manner described herein to form frame/battery cell assemblies 300' and battery modules 400' in the manner described herein with regard to frame/battery cell assemblies 300 and battery modules 400.

Figures 21, 22:
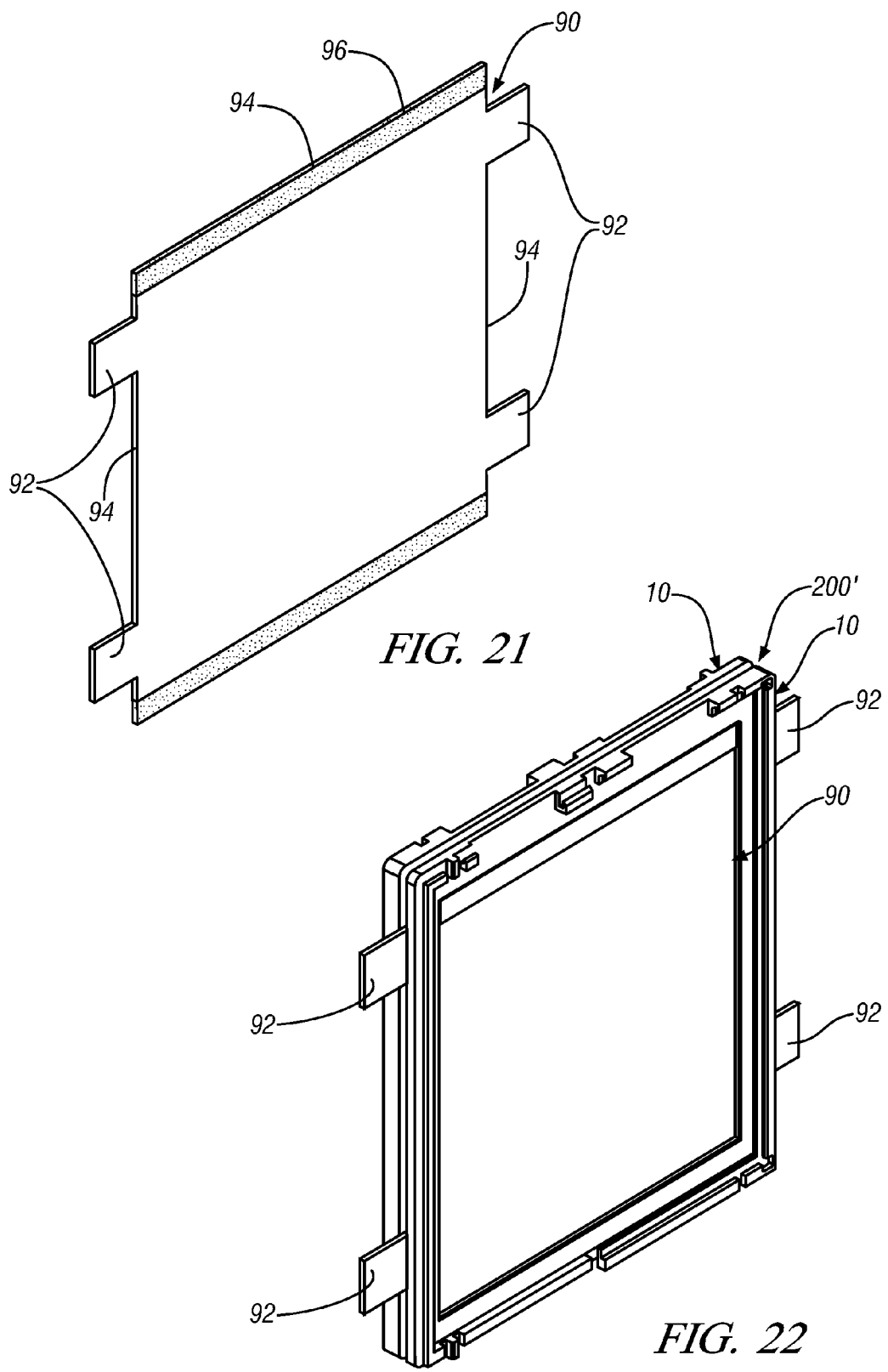
FIG. 21 is a perspective view of a third exemplary embodiment of a cooling member as disclosed herein.
FIG. 22 is a perspective view of a third exemplary embodiment of a frame assembly as disclosed herein.

Referring to FIGS. 21 and 22, a third exemplary embodiment of a cooling member 90 is disclosed. Cooling member 90 includes a thermally conductive sheet, such as a metal, metal alloy or thermally conductive polymer, or a combination thereof. Cooling member 90 may also include one or more cooling fins 92 that protrude outwardly from one or more sides 94 of cooling member 90. Cooling fins 92 may have any suitable size or shape. Particularly suitable sizes and shapes will include fin designs commonly used to promote heat transfer in similar devices that incorporate cooling fins for cooling. Cooling member 90 may also include a coating 96 along one or more sides 94. Coating 96 may include various polymer coatings. Cooling member 90 may be joined to frame members 10 in the manner described herein to form frame assemblies 200". Use of coatings 96 along the sides 94 of cooling member 90 may be useful to promote the joining of cooling member 90 and frame members 10. A plurality of frame assemblies 200" may be incorporated together with battery cells 100 to form a frame/battery cell assembly 300" and battery module 400" as described herein with regard to frame/battery cell assembly 300 and battery module 400.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least on the referenced items.

We claim:

1. A frame member for housing a battery cell, comprising:
   a frame having a plastic peripheral wall, first and second L-shaped arms, and a protrusion; the plastic peripheral wall having a first side wall, a second side wall, an upper wall, and a lower wall; the upper wall coupled to and extending between the first and second side walls, the lower wall coupled to and extending between the first and second side walls, the plastic peripheral wall further having an attachment face on a first side of the plastic peripheral wall and an opposed cooling face on a second side of the plastic peripheral wall;
   the first and second L-shaped arms being coupled to the upper wall and extending from the attachment face of the plastic peripheral wall;
   the first L-shaped arm having first and second portions, the first portion of the first L-shaped arm being coupled to and extending perpendicular to the attachment face, the second portion of the first L-shaped arm being coupled to and extending from an end of the first portion of the first L-shaped arm in a first direction perpendicular to the first portion of the first L-shaped arm and parallel to the attachment face such that a first space is defined between the first portion of the first L-shaped arm, the second portion of the first L-shaped arm, and the attachment face of the plastic peripheral wall; the first space having an open end between an end of the second portion of the first L-shaped arm and the attachment face of the plastic peripheral wall;
   the second L-shaped arm having first and second portions, the first portion of the second L-shaped arm being coupled to and extending perpendicular to the attachment face, the second portion of the second L-shaped arm being coupled to and extending from an end of the first portion of the second L-shaped arm in a second direction perpendicular to the first portion of the second L-shaped arm, the second direction being in an opposite direction relative to the first direction, the second portion of the second L-shaped arm further extending parallel to the attachment face such that a second space is defined between the first portion of the second L-shaped arm, the second portion of the second L-shaped arm and the attachment face of the plastic peripheral wall, the second space having an open end between an end of the second portion of the second L-shaped arm and the attachment face of the plastic peripheral wall;
   the second L-shaped arm being symmetrically opposed to the first L-shaped arm about a plane of symmetry that is perpendicular to the attachment face of the plastic peripheral wall;
   the protrusion being coupled to the upper wall and extending from the attachment face, the upper wall further having a mating recess extending therein, the first and second L-shaped arms being disposed on the upper wall between the protrusion and the mating recess;
   the plastic peripheral wall defining an opening that is configured to receive a battery cell therein, the upper wall of the plastic peripheral wall further having a first electrode channel configured to receive a first electrode of the battery cell therethrough such that the first electrode extends outside of the plastic peripheral wall.

2. The frame member of claim 1, wherein the protrusion and the mating recess being symmetrically opposed about the plane of symmetry.

3. The frame member of claim 1, wherein the upper wall of the plastic peripheral wall further having a second electrode channel configured to receive a second electrode of the battery cell therethrough such that the second electrode extends outside of the plastic peripheral wall.

4. The frame member of claim 3, wherein the first and second electrode channels are symmetrically opposed about the plane of symmetry.

5. The frame member of claim 4, wherein the first and second L-shaped arms are disposed between the first and second electrode channels in the upper wall.

6. A frame assembly for housing first and second battery cells, comprising:
   a first frame having a plastic peripheral wall and first and second L-shaped arms, the plastic peripheral wall having a first side wall, a second side wall, an upper wall, and a lower wall; the upper wall coupled to and extending between the first and second side walls, the lower wall coupled to and extending between the first and second side walls, the plastic peripheral wall of the first frame having an attachment face on a first side of the plastic peripheral wall and an opposed cooling face on a second side of the plastic peripheral wall, the first and second L-shaped arms being coupled to the upper wall and extending from the attachment face of the plastic peripheral wall of the first frame;
   the first L-shaped arm of the first frame having first and second portions, the first portion of the first L-shaped arm being coupled to and extending perpendicular to the attachment face of the first frame, the second portion of the first L-shaped arm being coupled to and extending from an end of the first portion of the first L-shaped arm in a first direction perpendicular to the first portion of the first L-shaped arm and parallel to the attachment face such that a first space is defined between the first portion of the first L-shaped arm, the second portion of the first L-shaped arm, and the attachment face of the plastic peripheral wall, the first space having an open end between an end of the second portion of the first L-shaped arm and the attachment face of the plastic peripheral wall;
   the second L-shaped arm of the first frame having first and second portions, the first portion of the second L-shaped arm being coupled to and extending perpendicular to the attachment face of the first frame, the second portion of the second L-shaped arm being coupled to and extending from an end of the first portion of the second L-shaped arm in a second direction perpendicular to the first portion of the second L-shaped arm, the second direction being in an opposite direction relative to the first direction, the second portion of the second L-shaped arm further extending parallel to the attachment face such that a second space is defined between the first portion of the second L-shaped arm, the second portion of the second L-shaped arm, and the attachment face of the plastic peripheral wall; the second space having an open end between an end of the second portion of the second L-shaped arm and the attachment face of the plastic peripheral wall;

the second L-shaped arm of the first frame being symmetrically opposed to the first L-shaped arm of the first frame about a plane of symmetry that is perpendicular to the attachment face of the plastic peripheral frame of the first frame, the plastic peripheral wall of the first frame defining a first opening that is configured to receive the first battery cell therein, the upper wall of the plastic peripheral wall further having a first electrode channel configured to receive a first electrode of the first battery cell therethrough such that the first electrode extends outside of the plastic peripheral wall;

a second frame having a peripheral wall and third and fourth L-shaped arms, the peripheral wall of the second frame having an attachment face and an opposed cooling face, the third and fourth L-shaped arms being located on the attachment face of the peripheral wall of the second frame;

the fourth L-shaped arm of the second frame being symmetrically opposed to the third L-shaped arm of the second frame about a plane of symmetry that is perpendicular to the attachment face of the second frame, the peripheral wall of the second frame defining a second opening that is configured to receive the second battery cell therein, the first and second battery cells being disposed between the first and second frames; and a cooling member having a corrugated sheet with a first side and a second side, the corrugated sheet defining a plurality of cooling channels extending across a width of the corrugated sheet, the first side of the corrugated sheet disposed against the opposed cooling face of the first frame and covering the first opening, the second side of the corrugated sheet disposed against the opposed cooling face of the second frame and covering the second opening, the first side of the corrugated sheet further disposed directly on the against the first battery cell.

7. The frame assembly of claim 6, wherein the plurality of cooling channels of the corrugated sheet receive a cooling fluid therein.

8. The frame assembly of claim 7, wherein the corrugated sheet is constructed of a metal or an engineering plastic, and the cooling fluid is a liquid or a gas.

9. The frame assembly of claim 6, wherein the first L-shaped arm of the first frame is configured to engage the fourth L-shaped arm of the second frame, and the second L-shaped arm of the first frame is configured to engage the third L-shaped arm of the first frame.

10. The frame assembly of claim 6, wherein the first frame further includes a first protrusion being coupled to the upper wall and extending from the attachment face of the plastic peripheral wall, the upper wall further having a first mating recess extending therein, the first and second L-shaped arms being disposed on the upper wall between the first protrusion and the first mating recess.

11. The frame assembly of claim 10, wherein the second frame further includes a second protrusion configured to be received in the first mating recess of the first frame, the second frame further includes a second mating recess configured to receive the first protrusion of the first frame therein.

12. A frame assembly for housing first and second battery cells, comprising:

a first frame having a plastic peripheral wall, first and second L-shaped arms, and a protrusion; the plastic peripheral wall having a first side wall, a second side wall, an upper wall, and a lower wall; the upper wall coupled to and extending between the first and second side walls, the lower wall coupled to and extending between the first and second side walls, the plastic peripheral wall of the first frame having an attachment face on a first side of the plastic peripheral wall and an opposed cooling face on a second side of the plastic peripheral wall, the first and second L-shaped arms being coupled to the upper wall and extending from the attachment face of the plastic peripheral wall of the first frame;

the second L-shaped arm of the first frame being symmetrically opposed to the first L-shaped arm of the first frame about a plane of symmetry that is perpendicular to the attachment face of the plastic peripheral frame of the first frame, the plastic peripheral wall of the first frame defining a first opening that is configured to receive the first battery cell therein, the upper wall of the plastic peripheral wall further having a first electrode channel configured to receive a first electrode of the first battery cell therethrough such that the first electrode extends outside of the plastic peripheral wall;

the first protrusion being coupled to the upper wall and extending from the attachment face of the plastic peripheral wall, the upper wall further having a first mating recess extending therein, the first and second L-shaped arms being disposed on the upper wall between the first protrusion and the first mating recess;

a second frame having a peripheral wall and third and fourth L-shaped arms, the peripheral wall of the second frame having an attachment face and an opposed cooling face, the third and fourth L-shaped arms being located on the attachment face of the peripheral wall of the second frame; and the fourth L-shaped arm of the second frame being symmetrically opposed to the third L-shaped arm of the second frame about a plane of symmetry that is perpendicular to the attachment face of the second frame, the peripheral wall of the second frame defining a second opening that is configured to receive the second battery cell therein, the first and second battery cells being disposed between the first and second frames.

* * * * *